UNITED STATES PATENT OFFICE.

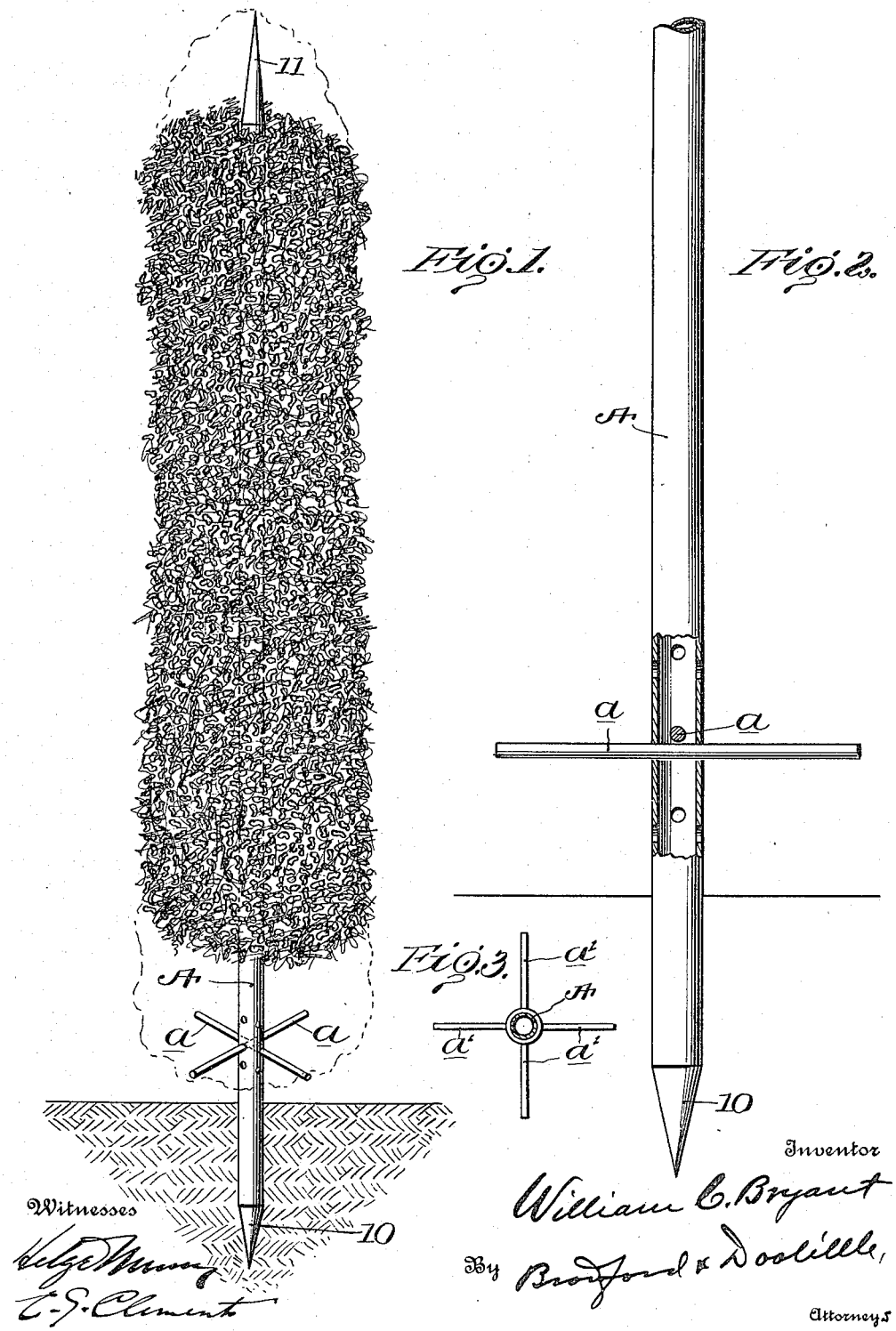

WILLIAM C. BRYANT, OF IVOR, VIRGINIA.

SUPPORT FOR PEANUT-STACKS.

1,167,676.  Specification of Letters Patent.  Patented Jan. 11, 1916.

Application filed February 1, 1915. Serial No. 5,565.

*To all whom it may concern:*

Be it known that I, WILLIAM C. BRYANT, a citizen of the United States, residing at Ivor, Southampton county, and State of Virginia, have invented and discovered certain new and useful Improvements in Supports for Peanut-Stacks, of which the following is a specification.

My said invention consists of an improved device for use in forming and supporting stacks of peanut vines after harvesting and during the process of curing, whereby the operation of stacking is materially assisted and the stacks are maintained in an advantageous form for the purpose, and a device for the purpose is provided which is comparatively inexpensive and very durable, all as will be hereinafter more fully described and claimed.

Referring to the accompanying drawings which are made a part hereof and on which similar reference characters indicate similar parts, Figure 1 is a perspective view illustrating a stack of peanuts formed on my improved device, the upper and lower ends of the stack being indicated by dotted lines in order to expose these portions of the stake, or stacking device, to show their form and arrangement more clearly, Fig. 2 a view partly in elevation and partly in section of the lower end of a stacking device, or stake, of my improved construction, on an enlarged scale, and Fig. 3 a detail view showing a modification.

Said stacking device consists of a hollow metal stake A, preferably formed of galvanized iron, or similar durable yet inexpensive metal, and formed with a conical pointed lower end 10 and a similar conical pointed upper end 11, both ends being tapered to sharp points, the lower one to adapt it for more ready insertion in the ground, and the upper end to adapt it to readily pierce the peanut vines as they are placed in position thereon. Near the lower end said stake A is preferably formed with horizontal perforations extending at right angles and at intervals apart one above the other, in which cross arms or pins $a$ may be inserted, these cross arms or pins extending in relation to each other as shown in Fig. 1, and are positioned a short distance above the ground. They are adapted to support the lower end of the stack so that the peanut vines will be free from the ground to permit the air to circulate freely between the ground and the lower end of the stack. It will be understood, of course, that these pins are not indispensable, as other means may be provided for the same purpose, but I regard them as a material advantage and convenience in the use of the device. Such a modification as shown in Fig. 3 might be substituted, wherein a ring with radial arms $a^1$ is secured on the stake at the point desired.

In use, the stake is placed in the ground as indicated in Fig. 1, with the cross arms $a$ a short distance above the ground, and the peanut vines are slid down over the sharp pointed top 11 of the stake, and the stack built up from the cross arm $a$ to the top of the stake, as indicated by dotted lines in Fig. 1.

The stakes, being of metal, are durable and can be used season after season, and being formed of comparatively thin metal and hollow, they may not only be of sufficient diameter to be stiff and give the required support to the stack, but are also comparatively inexpensive and are light and easily handled.

Having thus fully described my said invention, what I claim as new and desire to secure by Letters Patent, is:

1. A stacking device for forming and supporting stacks of peanut vines consisting of a hollow metallic stake provided with a solid conical or pointed lower end and a solid conical or pointed upper end, a series of transverse perforations formed at intervals in said post, and cross-bars or rods adapted to be inserted in said perforations to form a support for the lower end of the stack, one cross-bar extending in one direction and the other cross-bar at right angles thereto, substantially as set forth.

2. A device for forming stacks of peanut vines comprising a hollow metallic stake with a pointed lower end and a pointed upper end and with a series of transverse perforations one above the other and at right angles to each other near the lower end thereof, and with horizontal arms or pins mounted in said perforations, substantially as set forth.

In witness whereof, I have hereunto set my hand and seal at Ivor, Virginia, this 16th day of January, A. D. nineteen hundred and fifteen.

WILLIAM C. BRYANT. [L. S.]

Witnesses:
 THOS. L. BAIN,
 T. A. SAUNDERS.

Copies of this patent may be obtained for five cents each, by addressing the "Commissioner of Patents, Washington, D. C."